April 5, 1938.  C. McKINNON  2,113,056
AUTOMOBILE AND BUS QUICK STOPPING SAFETY DEVICE
Filed Jan. 27, 1936  4 Sheets-Sheet 1

Inventor.
Charles McKinnon

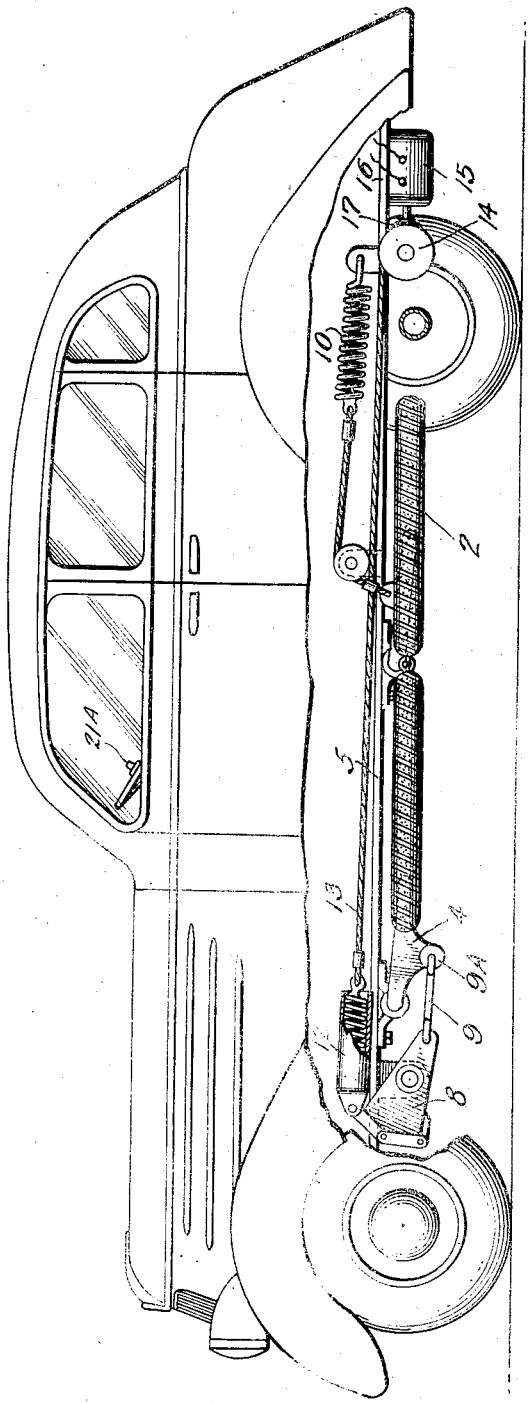

April 5, 1938. C. McKINNON 2,113,056
AUTOMOBILE AND BUS QUICK STOPPING SAFETY DEVICE
Filed Jan. 27, 1936 4 Sheets-Sheet 3

Inventor
Charles McKinnon

April 5, 1938.    C. McKINNON    2,113,056
AUTOMOBILE AND BUS QUICK STOPPING SAFETY DEVICE
Filed Jan. 27, 1936    4 Sheets—Sheet 4
Fig. 4.
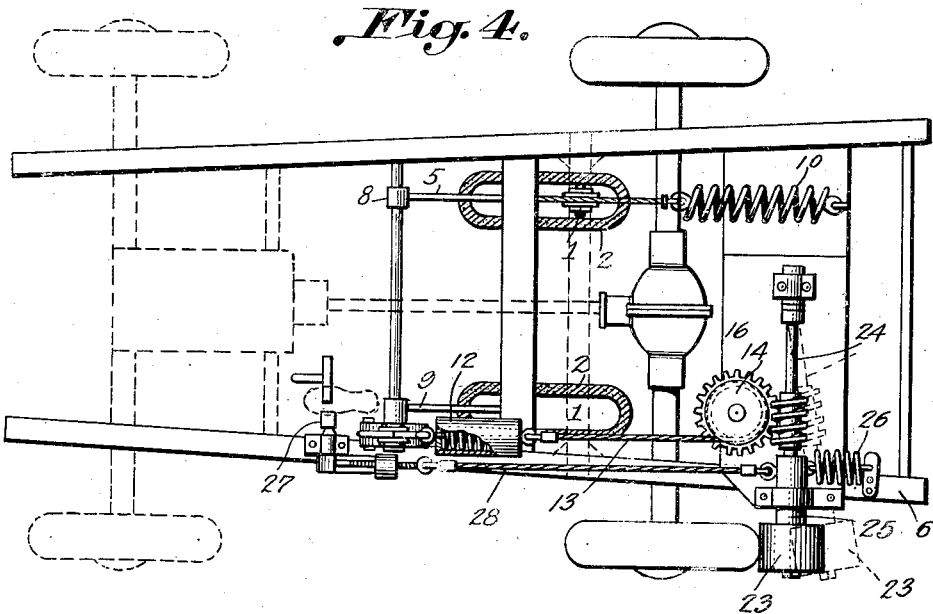
Fig. 5.
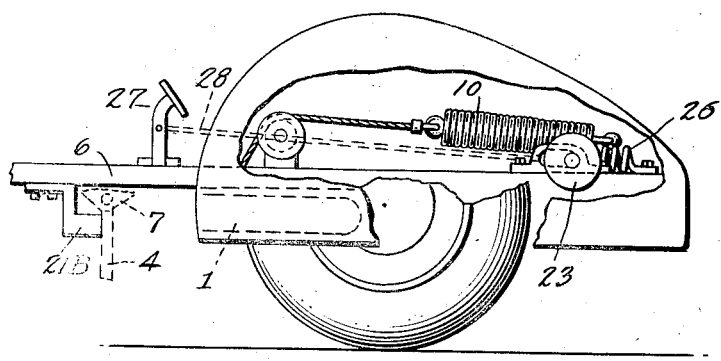
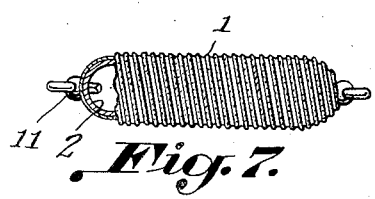
Fig. 7.
Inventor.
Charles McKinnon Patented Apr. 5, 1938

2,113,056

UNITED STATES PATENT OFFICE 2,113,056

AUTOMOBILE AND BUS QUICK-STOPPING SAFETY DEVICE

Charles McKinnon, Mindenmines, Mo.

Application January 27, 1936, Serial No. 61,064

10 Claims. (Cl. 188—5)

My invention relates to new and useful improvements in a device which is strong and durable, requiring only a very small motor, and very few working parts; the first cost is therefore comparatively small, when the device is manufactured as a part of new motor vehicles or attached to the ones now in use.

Other objects of my invention are to provide a quick-stopping and anti-skid device, consisting of one section or a plurality of sections which can be flexibly coupled together and providing means whereby the operation of the device is controlled from the driver's seat.

While my invention is intended for use more as a safety-first means of stopping motor vehicles when there is danger of a collision, the device can be used at any time with or without the wheel brakes, which, owing to their frequent use, are not always in the best working order for making quick stops, resulting very frequently in serious accidents and causing property damage; with my invention applied this danger is avoided or reduced to a considerable extent, by the large amount of flat rubber-covered braking surface of the base plates coming in contact with the pavement; this braking effect of the quick-stopping and anti-skid device is more like the effect of a drag load of sufficient weight, gradually applied to retard the forward movement of a motor vehicle going at high speed many times more quickly than the wheel brakes alone, with the rolling forward sliding movement of the tires on the pavement when making quick stops.

Another advantage in using this safety device is the additional safety it insures to the occupants of motor vehicles when a collision occurs as the motor vehicle will stand a much harder crash and there will be less danger of upset, skidding, or the car being pushed off the pavement. The base plates will also give increased stopping effect and hold the automobile from skidding, in weather conditions which make driving difficult.

Considering the high rate of speed at which motor vehicles are now driven, and the increasing number of accidents, I believe by the use of my invention it will be the means of greatly reducing the number of accidents in driving motor vehicles on the public highways.

With the above and other objects in view, as hereinafter more fully described in the specification and illustrated in the drawings, in which Figures 1, 2, 3, and 4 are side views, Figure 1 shows the quick-stopping and anti-skid device attached to an automobile, in an operative position on the pavement.

In Figure 2, the device is seen in the raised, folded position, when not in use.

Fig. 4 illustrates a plan view showing a friction gear in contact with one of the tires and means for operating the device.

Fig. 5 represents a side elevation showing said gear out of contact with the tire.

Fig. 7 is a plan view of one base plate showing the lower face of the rubber covering with a portion cut away to show a link coupling.

Figure 1:
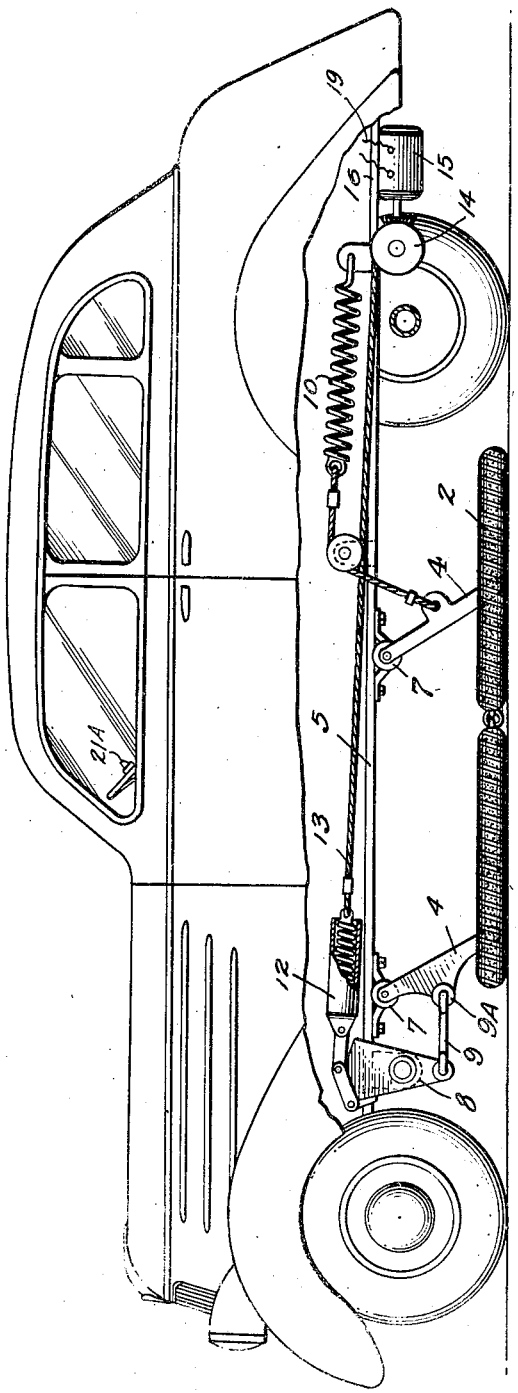
Figure 6:
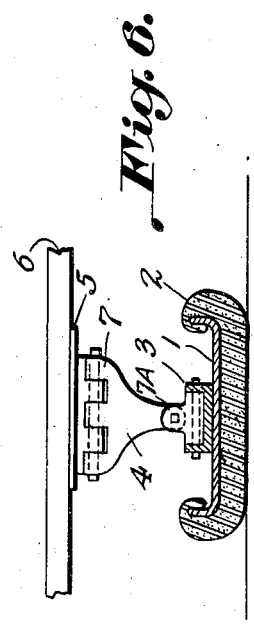
Fig. 6 illustrates a cross-section view of one base plate with a lower universal like coupling and an upper hinge-like joint.

In carrying out my invention I provide a plurality of base plates, flexibly coupled together and connected to a motor vehicle frame or other suitable supporting structure; one plate or a series of base plates may be tandem positioned at the opposite sides of the driving shaft; each base plate consists of a lower plate (1), having upright rounded sides and ends. Secured to the lower face and other portions of this base plate (1), is a covering of rubber (2), or other resilient material, in order to produce a frictional contact on the pavement when the device is placed in operation; a U shaped plate (3) is attached to and extends longitudinally through the central portion of said base plate (1). The mentioned plates may be electrically welded together, or attached in any other suitable manner; this constructon makes a very strong and light base plate.

A series of angular positioned levers 4 are used to connect the base plates 1 to a plate 5, or support attached to the motor vehicle frame 6; a universal joint connects the lower ends of said levers to the U-shaped plates 3, and their upper ends are attached to plate 5 by a hinge-joint comprising a series of spaced eyes formed on the upper end of the levers and lower face of plate 5, and a bolt is extended through the eyes for connecting said levers and plates; the above connecting parts are strongly constructed for holding the base plates from transverse movement, while the universal joints give the required amount of flexible movement, so that the rubber-covered face of base plates will lie flat on the pavement, no matter what angular position the motor vehicle is in, or regardless of the uneven surface of the pavement; an upright lever (8) is pivotally connected at its intermediate portion to the plate (5) or frame (6). The lower end of this lever (8) and the intermediate portion of lever (4) are connected to the opposite ends of a rod (9) by a link connection (9a). The base plates (1) are held away from the pavement in the raised folded position by a spiral spring 10 having one of its ends attached to the frame 6 and the other end to a lever 4. When more than one base plate is used the inner ends are connected by a link or short chain (11).

A yielding effect is transmitted to the base plates when they first come in contact with the pavement by the use of a spiral spring hitch (12), which has one end connected to the upper end of lever (8), it being free to swing in a to and fro direction, and the other end is attached to the loose end of a cable (13); the other end of the cable is wound on a drum (14) which, together with an electric motor (15), is mounted on a plate (16) suitably mounted on the motor vehicle frame (6); the electric motor (15) or power motor is operatively connected by a suitable gearing (17) and for operating the drum (14), or a drum can be carried on the ends of a transverse shaft (14) journaled at the rear portion or any other suitable position on a motor vehicle frame, and a cable (13) connected to each drum (14) and the base plates (1) positioned at the opposite sides of the driving shaft, or the cable (13) can be taken around a suitably mounted pulley and any number of base plates operated by the one drum (14), as shown in Fig. 5. The electric motor (15) used for operating the device is operatively connected by suitable electric conductors (19) for the flow of current from the battery of the motor vehicle to a switch (21A) or control on the steering-wheel, by which means the device is operated.

The motor vehicle springs give a yielding effect in an upright direction and the spring hitch in a horizontal direction, without jar or shock or the tendency of being thrown forward when making a quick stop.

Figure 3:
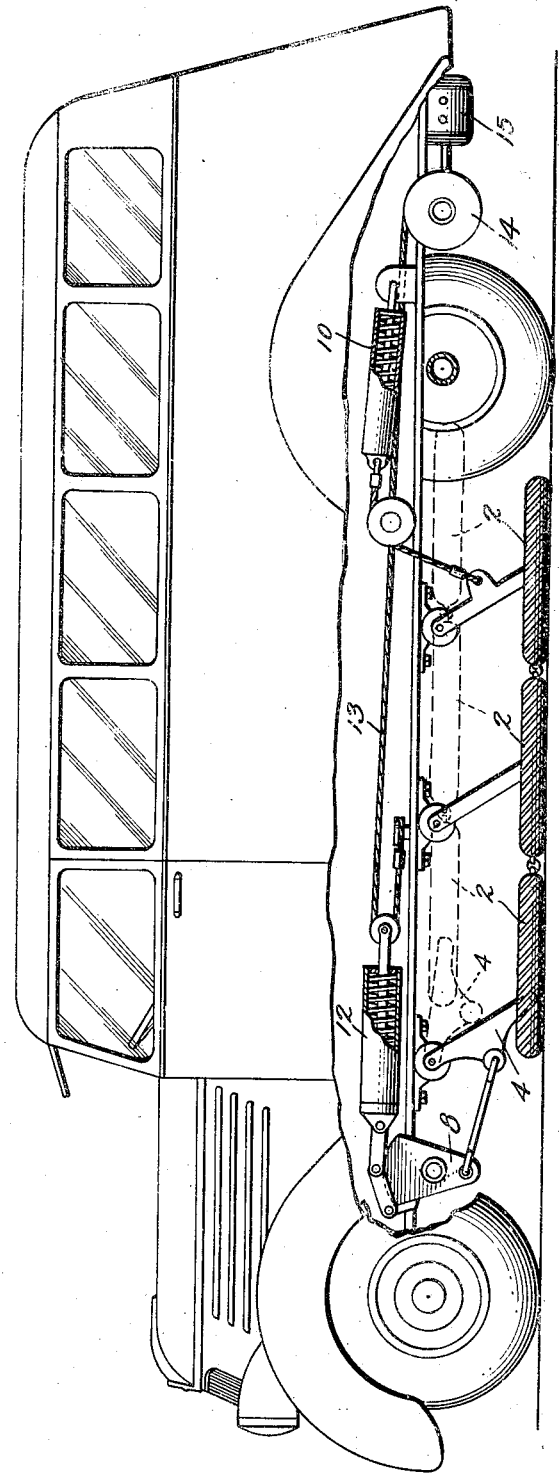
Figure 3 shows the quick stopping and anti-skid device attached to a passenger bus, with the base plates shown in full lines on the pavement and when raised from the pavement they are shown in the dotted lines.

Figure 3 represents a side elevation of a passenger bus with three base plates connected to the frame (6) and a hitch connection showing how the pulling power of the electric motor can be doubled by the use of a pulley wheel attached to the front end of the spring hitch (12). The free end of cable (13) after passing around said pulley is secured to the frame (6) behind the lever (8), carrying the spring hitch (12). The other end of cable (13) is wound on the drum (14), with which the motor (15) may be mounted near the lower rear portion of passenger buses, automobiles, trucks and trailers.

The operation of my quick-stopping and anti-skid device is as follows:

Assuming that this device is applied to a motor vehicle and there is danger of a collision from fast-driving or other causes requiring a quick stop, the switch-button (21A) on the steering-wheel is pressed. The electric motor (15) is now operated, causing a rotation of the drum (14) through a suitable gearing connection. As the cable (13) is wound upon the drum (14), the loose end of the cable (13), being connected to the spring hitch (12) attached to the upper end of lever (8) which is connected by the rod (9) to the angular positioned lever (4), pulls the base plates (1), from the raised position in Fig. 2, to the position on the pavement, shown in the upright dotted lines of the levers (4) shown in Fig. 1.

The motor vehicle is now brought to a stop by the lever (4a) lowering the plates 1. A spiral spring (10) attached to the levers (4) and frame (6) will be placed under tension when the device is in the position in Fig. 1.

The driver now moves the automobile forward and the spiral spring (10), by its contraction, pulls the quick-stopping device from the pavement back to its normal position, in the dotted lines Fig. 1. The spiral spring (10) in pulling the device from the pavement rotates the drum (14) and armature in the opposite direction from which they rotate when the current is on. With this construction, the device is held away from the pavement close to the under side of the motor vehicle frame when not in use, while at the same time it is free for instant use by the simple operation of pressing an electric switch-button (21A) on the steering-wheel. This quick-stopping and anti-skid device is brought into effective operation and produces a very powerful braking effect by the rubber-covered face of the base plate (1) coming in contact with the pavement.

If desired, the power used for propelling the vehicle can be used to operate the device. A friction gear (23) on the outer end portion of a shaft (24), which is coupled to the drum (14), is arranged to come in contact with one of the tires of the automobile; the shaft is journaled in a movable support (25) mounted on the frame (6) and a spiral spring (26) connected to the frame and support holds the friction gear (23) out of contact with the tire, when not in use. With this construction, the device is placed in operation on the pavement by pressing down on a foot pedal (27) connected to the movable support (25) by a cable (28). This foot pedal can be placed close enough to the clutch pedal so that both may be operated simultaneously or separately. The dotted line in Fig. 5, plan view, represents the inoperative position of the shaft 24. When the foot 27 is released the contraction of the spiral springs 24 will disengage the gearing so that the drum 14 is free to rotate in the reverse direction. The power operated means is very quick, which in many cases is of the greatest importance in making a quick stop, in order to avoid accident when driving an automobile.

An advantage in using the spring hitch 12, is the yielding effect it affords when the lever 4 contacts stop 21b (see Fig. 5), secured to the lower portion of frame 6, without bringing the electric motor 15 to a sudden stop before the driver is ready to release the steering wheel switch button 21a, which is open at all times except when using the device.

Having thus described my invention, what I claim as new, and desire to secure by Letters-Patent is:

1. A quick-stopping and anti-skid device comprising a plurality of base plates flexibly coupled together, each plate having upright rounded sides and ends, with a suitably formed covering of rubber or resilient material mounted on said base plates, a series of angular positioned levers having their lower ends flexibly coupled to the upper portion of said base plates, a connection between the upper ends of said levers and a support secured to the lower portion of a motor vehicle frame, yielding means comprising a spring hitch, a cable connected to said hitch, a drum upon which the cable is wound, an operative connection between the angular positioned levers and said cable, an electric motor and a control switch therefor, a gearing connection between said electric motor and the cable carrying drum, a coil-spring operatively connected to the angular levers and framework; said spring being suitably positioned for pulling the base plates from the pavement when the electric motor switch or circuit is open.

2. A quick-stopping and anti-skid device comprising a plurality of base plates flexibly coupled together; a covering of rubber, secured to the lower face with a tapering portion extending over the upright rounded sides and ends of each base plate; a U shaped plate secured to the upper face of said base plates, said base plates having their adjacent ends linked together in tandem arrangement at the opposite sides of the drive shaft; a series of angular positioned levers, comprising a connection flexibly coupling their lower ends to the U shaped plate and the upper ends of said levers being secured to supporting plates carried on the motor vehicle frame; upright levers pivotally mounted on said frame, connecting rods operatively coupling the intermediate portion of the angular levers and the lower ends of said upright levers; a spring hitch connected to the upper end of an upright lever; a cable connected to the free end of said hitch and a drum upon which the cable is wound; horizontally arranged spiral springs attached to the angular levers and framework for holding the base plates out of contact with the pavement, said springs also tending to check the forward movement of the angular levers near the upright position; a gearing connection between an electric motor and said drum, which is caused to rotate in the reverse direction when the electric circuit is open, by the contraction of the spiral springs; electrical means comprising a switch mounted on the steering wheel, and conductors connecting the electric motor, said switch and battery to a source of electric current on the motor vehicle.

3. A safety-first quick-stopping and anti-skid device for motor vehicles, comprising a plurality of base-plates, having a suitably-formed covering of rubber secured to their lower face with a tapering portion extending over the upright rounded sides and ends, said plates having their adjacent ends flexibly connected in tandem arrangement at the opposite sides of the vehicle drive shaft; a series of angular positioned levers having a connection flexibly coupling their lower ends with the upper portion of the base plates, and the upper ends being secured to supports on the lower framework of the motor vehicle; a transverse shaft carrying upright levers pivotally mounted on the frame; rods connecting their lower ends with the intermediate portion of the angular levers; horizontally arranged spiral springs attached to said angular levers and frame, for holding the base plates out of contact with the pavement, said springs also tending to check the forward movement of the angular levers near the upright position; a spring hitch connected to the upper end of an upright lever; a cable connected to the free end of said hitch, and a drum upon which the cable is wound; a gearing connection between an electric motor and the cable-carrying drum, which is caused to rotate in the reverse direction, when the electric circuit is open and when said drum is free from the electric motor power-driving means, by the contraction of the spiral springs; electrical means comprising a switch mounted on the steering-wheel and conductors connecting said switch with a course of electric current on the motor vehicle.

4. A quick-stopping and anti-skid device comprising a plurality of base plates flexibly coupled together; a series of angular levers having their lower ends flexibly connected to the upper face and the upper ends secured to suitably positioned supports on the motor vehicle frame; a covering of resilient frictional material carried on the lower face of said base plates, horizontally arranged spiral springs attached to the levers and frame for holding the base plates out of contact with the pavement; said springs also tending to stop the angular levers near the upright position, a flexible element forming a yielding connection between the base plates and a drum mounted on the framework; a driving connection between said drum and a generated source of power; means comprising a friction gear carried on the outer end of a flexible shaft journaled in supports on the frame; a spiral spring attached to the frame and a support, this support being movably mounted; a foot pedal mounted on the frame; a cable connecting said pedal and movable support, said foot pedal being positioned close to the clutch pedal whereby both of said pedals can be operated simultaneously or separately, and electrical means for operating the safety device from the steering wheel switch.

5. A quick-stopping and anti-skid device comprising a base plate having upright rounded sides and ends, with a suitably formed covering of rubber or resilient material mounted on said plate, an angular positioned lever having its lower end flexibly coupled to said base plate, a connection between the upper end of said lever and a support, yielding means comprising a spring hitch, a cable connected to said hitch, a drum upon which the cable is wound, an operative connection between the lever and said cable, a gearing connection between a driving mechanism and the cable carrying drum, and a coil spring operatively connected to the angular lever and suitably positioned for pulling the base plate to a raised position.

6. A quick-stopping and anti-skid device comprising a plurality of base plates flexibly coupled together, each plate having upright, rounded sides and ends, with a suitably formed covering of rubber or resilient material mounted on said base-plates, a series of angular positioned levers having their lower ends flexibly coupled to upper portion of said base plates, a connection between the upper ends of said levers, and a support secured to the lower portion of a motor vehicle frame, yielding means comprising a spring hitch, a cable connected to said hitch, a drum upon which the cable is wound, an operative connection between the angular positioned levers and said cable, an electric motor and a control switch therefor, a gearing connection between said electric motor and the cable carrying drum, a coil-spring operatively connected to the angular levers and framework; said springs being suitably positioned for pulling the base plates from the pavement when the electric motor switch is open, for making quick stops and controlling the speed of motor vehicles.

7. A quick-stopping and anti-skid device comprising a plurality of base plates flexibly coupled together; a covering of cross-grooved centipede grip rubber, secured to the lower face with a tapering portion extending over the upright rounded sides and ends of each base plate; a U shaped plate secured to the upper face of said base plates, said base plates having their adjacent ends linked together in tandem arrangement at the opposite sides of the drive shaft; a series of angular positioned levers, comprising a connection flexibly coupling their lower ends to the U shaped plate and the upper ends of said levers being shaped with a broad upper end and downwardly tapering curved sides with their upper ends secured to supporting plates carried on the motor vehicle frame; upright levers pivotally mounted on said frame, connecting rods operatively coupling the intermediate portion of the angular levers and the lower ends of said upright levers; a spring hitch connected to the upper end of an upright lever; a cable connected to the free end of said hitch and a drum upon which the cable is wound; horizontally arranged spiral springs attached to the angular levers and framework for holding the base plates out of contact with the pavement, said springs also tending to check the forward movement of the angular levers near the upright position; a gearing connection between an electric motor and said drum, which is caused to rotate in the reverse direction when the electric circuit is open by the contraction of the spiral springs; electrical means comprising a switch mounted on the steering wheel, and conductors connecting the electric motor, said switch and a battery to a source of electric current on the motor vehicle.

8. A quick-stopping and anti-skid device comprising a base plate having upright round sides and ends, with a covering of cross grooved centipede grip rubber mounted on the lower face of said plate, an angular positioned lever shaped with downwardly tapering curved sides and having its lower end flexibly coupled to said plate, a connection between the upper end of said lever and a support, yielding means comprising a spring hitch, a cable connected to said hitch, a drum upon which the cable is wound, an operative connection between the lever and said cable, a gearing connection between the driving mechanism and the cable carrying drum, and a coil spring operatively connected to the angular lever and suitably positioned for pulling the base plate to a raised position.

9. A quick-stopping and anti-skid device comprising a plurality of base plates flexibly coupled together; a series of angular levers having their lower ends flexibly connected to the upper face and the upper ends secured to suitably positioned supports on a motor vehicle frame; a covering of cross-grooved resilient frictional material carried on the lower face of said base plates, horizontally arranged spiral springs attached to the levers and frame for holding the base plates out of contact with the pavement; said springs also tending to stop the angular levers near the upright position, a flexible element forming a yielding connection between the base plates and a drum mounted on the framework; a driving connection between said drum and a generated source of power; means comprising a friction gear carried on the outer end of a flexible shaft journaled in support on the frame; a spiral spring attached to the frame and a support, this support being movably mounted; a foot pedal mounted on the frame; a cable connecting said pedal and movable support, said foot pedal being positioned close to the vehicle clutch pedal whereby both of said pedals can be operated simultaneously or separately, and electrical means for operating the safety device from a steering wheel switch.

10. A safety-first quick-stopping and anti-skid device for motor vehicles, comprising a plurality of base-plates, having a suitably-formed covering of cross-grooved centipede grip rubber, secured to their lower face with a tapering portion extending over the upright rounded sides and ends, said plates having their adjacent ends flexibly connected in tandem arrangement at the opposite sides of the vehicle drive shaft; a series of angular positioned levers having a broad upper end and downwardly tapering curved sides, a connection flexibly coupling their lower ends with the upper portion of the base plates, and the upper ends being secured to supports on the lower framework of the motor vehicle; a transverse shaft carrying upright levers pivotally mounted on the frame; rods connecting their lower ends with the intermediate portion of the angular levers; horizontally arranged spiral springs attached to said angular levers and frame, for holding the base plates out of contact with the pavement, said springs also tending to check the forward movement of the angular levers near the upright position; a spring hitch connected to the upper sector shaped end of an upright lever; a cable connected to the free end of said hitch, and a drum upon which the cable is wound; a gearing connection between an electric motor and the cable-carrying drum, which is caused to rotate in the reverse direction, when the electric circuit is open and when said drum is free from the power-driving means, by the contraction of the spiral springs; electrical means comprising a switch mounted on a steering wheel and conductors connecting said switch with a course of electric current on the motor vehicle.

CHARLES McKINNON.